United States Patent [19]
Slinger

[11] 3,882,715
[45] May 13, 1975

[54] AIR LEAK DETECTOR
[75] Inventor: William R. Slinger, Kearney, N.J.
[73] Assignee: Treadwell Corporation, New York, N.Y.
[22] Filed: July 5, 1973
[21] Appl. No.: 376,745

[52] U.S. Cl.................................. 73/46; 73/49.8
[51] Int. Cl............................................ G01m 3/28
[58] Field of Search............ 73/49.8, 49.6, 49.1, 46, 73/40

[56] References Cited
UNITED STATES PATENTS
| | | | |
|---|---|---|---|
| 2,342,616 | 2/1944 | O'Brien | 73/46 |
| 2,507,124 | 5/1950 | Stillinger | 73/49.6 |

*Primary Examiner*—Richard C. Queisser
*Assistant Examiner*—Joseph W. Roskos
*Attorney, Agent, or Firm*—Bierman & Bierman

[57] ABSTRACT

Apparatus for detecting leaks in joints is provided in which a barrel having a seal is pressed against a tube sheet. The seal is larger in diameter than the exterior diameter of a tube welded to the sheet. An axial rod extends in and also past the end of the barrel. The extension carries an expandable plug which fits into and upon expansion, seals off the interior of the tube. A vacuum chamber is created adjacent the sheet one wall of which is formed by the expandable plug, the other wall being formed by a barrel plate inserted in the barrel at a point spaced from the tube sheet.

1 Claim, 1 Drawing Figure

PATENTED MAY 13 1975         3,882,715
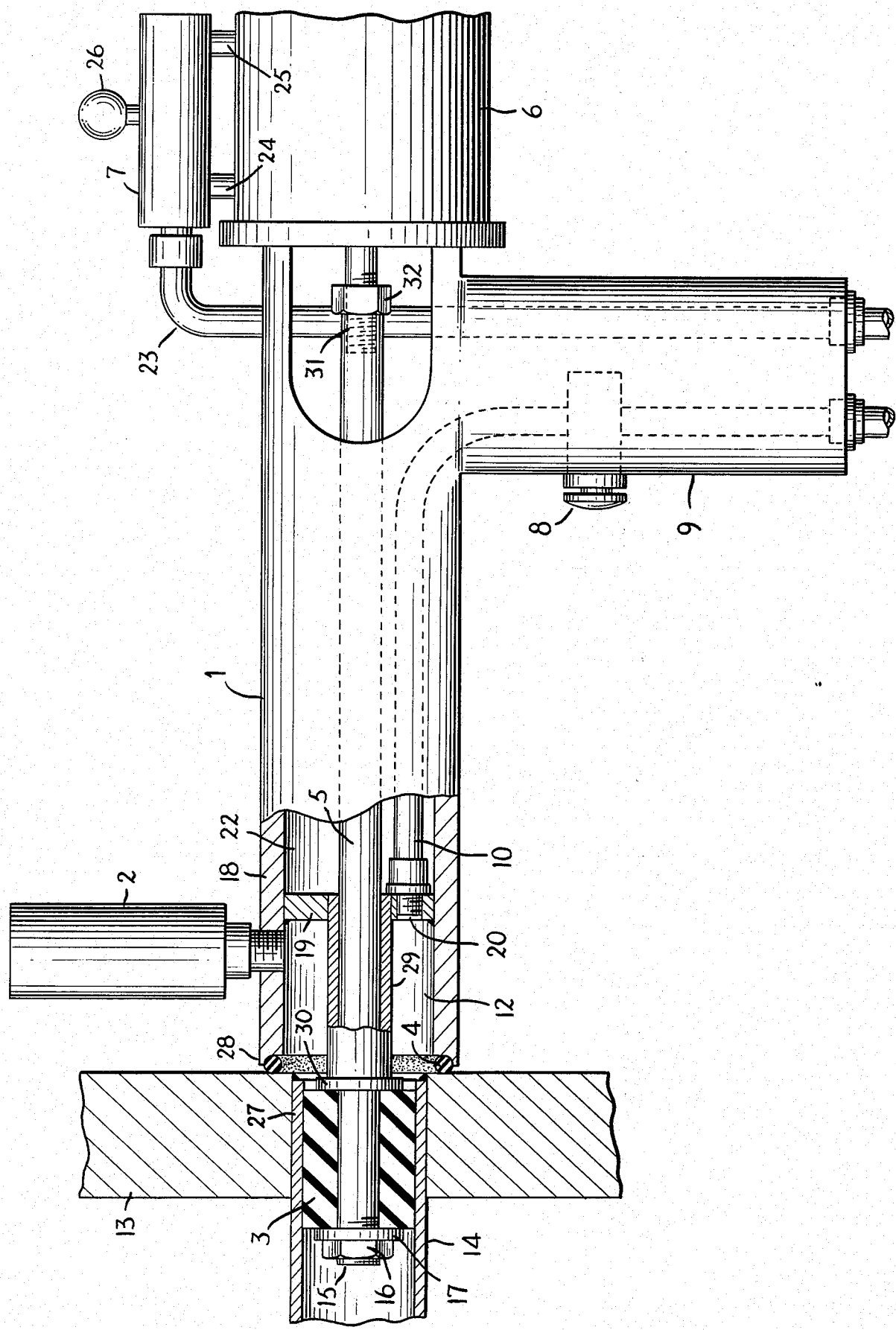

AIR LEAK DETECTOR

The present invention is directed to a method and apparatus for detecting air leaks; more specifically, for testing steam condenser tubes at the junction between the ends of the tubes and the tube sheet.

In certain types of condensers, particularly steam condensers, it is necessary that the tubes be welded to a generally planar supporting member called a tube sheet. In order that the condenser operate properly, a gas tight seal must be formed at the joint between the tube end and the tube sheet. The weld is usually applied at the junction between the outside periphery of the tube and the inside periphery of the opening on the tube sheet.

Once this has been done it is necessary to test each weld in order to insure that it is gas tight. The prior art method for doing this is to make the entire condenser housing air tight by installing temporary enclosures to form an air tight chamber of which the tube sheets comprise the end walls. The pressure inside the chamber is then raised, for example 5 psi, by introduction of compressed air. The welds are then checked for leaks by applying a solution of detergent and water around each weld and inspecting for air bubbles. The presence of such bubbles would indicate a leak.

It is among the objects of the present invention to provide an improved substitution for the aforementioned prior art procedure.

It is also among the objects of this invention to eliminate the necessity of creating a gas tight chamber in order to test the welds.

It is further among the objects of this invention to provide a detection method and apparatus which will measure directly the tightness of the joints being tested.

In the accompanying drawing constituting a part hereof and which like reference characters indicate like parts, the single FIGURE is a diagrammatic view partly in section showing the improved apparatus of the present invention.

In practicing the present invention, there is provided a body 1 having a barrel 18 and a hand grip 9. Barrel 18 is provided with bore 22 in which is mounted barrel plate 19. The joint between barrel plate 19 and the inside wall of bore 22 is gas tight. A vacuum hole 20 communicating with passage 10 is provided in plate 19. Draw rod 5 is mounted on support 29 and projects out of bore 18. One end 15 of rod 5 projects into tube 14 and carries expandable plug 3 adjacent the end thereof.

Expandable plug 3 is located between washer 17 and retainer 30. Washer 17 is fixed on rod 5 as for example, by lock nut 16. Retainer 30 is fixed with relation to barrel 18, as for example, by attaching it to support 29. O ring 4 is mounted on near end 28 of barrel 18 and is adapted to form an air tight seal between near end 28 and the outer face of tube sheet 13.

Vacuum gauge 2 is mounted on barrel 18 and is in communication with chamber 12 formed by the inner wall of barrel 18, barrel plate 19, O ring 4, tube sheet 13 and tube end 27.

Draw rod 5 is adapted for axial reciprocal movement toward and away from tube end 27. The means for causing this motion preferably comprises air cylinder 6 containing a piston therein. One end of the piston is attached to remote end 31 of rod 5 by coupling nut 32. Air pressure line 23 communicates with air control valve 7. Movement of air control handle 26 permits air flowing through line 23 to be selectively introduced into air cylinder 6 through withdrawal air passage 24 or projection air passage 25. Thus by introducing air through withdrawal passage 24 the piston is forced away from barrel 18 and causes rod 5 to move in the same direction.

The foregoing device is a convenient and accurate means for testing a joint for air leaks. The most common type of joint to be tested by the present apparatus comprises a tube 14 having a tube end 27 which fits into an opening in the tube sheet 13. The end 27 is welded to sheet 13 near the outer surface thereof.

One end 15 of draw rod 5 is inserted into tube 14 until O ring 4 seals against the outer face of sheet 13. Fluid is introduced through line 23 and withdrawal passage 24 to cause the piston to move away from barrel 18. This carries draw rod 5 with it. However, since washer 17 is fixed to rod 5 and retainer 30 is fixed to support 29, plug 3 is compressed therebetween. This compression is continued until the sides of plug 3 seal against the inner wall of tube 14. This not only provides an air tight seal but also causes O ring 4 to be compressed between near end 28 of barrel 18 and the outer wall of sheet 13. The end wall of chamber 12 is then formed by sheet 13 and the joint to be tested.

Control valve 8 is then opened and fluid is permitted to pass through fluid passage 10. Preferably, fluid is evacuated from barrel 12 to form a vacuum therein. After chamber 12 has been evacuated, control valve 8 is then closed and gauge 2 is read. Should there by any leak at the joint being tested, the vacuum in chamber 12 will decrease and this can be easily detected by gauge 2.

Clearly, the apparatus would function equally well if air pressure were introduced into chamber 12 or if another fluid were used. Similarly other changes and variations in the apparatus and method may be made without departing from the scope or spirit thereof. For example, any means can be used for withdrawing the rod in order to cause the plug to exapnd. Withdrawal can take place by hand rather than by the use of a hydraulic cylinder. The plug can be made inflatable to eliminate the necessity for reciprocation of the rod.

Although only a limited number of embodiments of this invention have been specifically described, the invention is nonetheless to be broadly construed and not to be limited except by the character of the claims appended hereto.

What is claimed is:

1. A device for detecting leaks in a joint between a tube sheet and a tube end fitted into an opening in said sheet comprising a barrel having an internal diameter larger than the external diameter of said tube, and sealing means surrounding said barrel at one end thereof adapted to seal said barrel to said sheet when said barrel is placed against said sheet, a draw rod in said barrel having an end extending beyond said barrel, a radially expandable plug surrounding at least a portion of the draw rod which extends from said barrel, said plug fitting inside said tube, means for expanding said plug to seal said tube, a chamber located at the end of said barrel, the sheet and plug defining one wall of said chamber, and a barrel plate internal to and spaced from said plug defining the other wall of said chamber, means for evacuating said chamber to a pressure below atmospheric pressure, gauge means connected to said chamber for reading increases in pressure in said chamber after evacuation, means for isolating said chamber from the vacuum source, and means for reciprocating said rod which means comprises a cylinder, a piston in said cylinder, means for selectively introducing a fluid on either side of said piston, said piston being attached to the end of said rod at a position remote from the end of said barrel.

* * * * *